US012662860B2

(12) United States Patent
Napthine

(10) Patent No.: US 12,662,860 B2
(45) Date of Patent: Jun. 23, 2026

(54) HINGE LOCKING MECHANISM

(71) Applicant: Gatemaster Ltd, Bognor Regis (GB)

(72) Inventor: Simon Garth Napthine, Eastergate (GB)

(73) Assignee: Gatemaster Ltd, Bognor Regis (GB)

( * ) Notice: Subject to any disclaimer, the term of this patent is extended or adjusted under 35 U.S.C. 154(b) by 0 days.

(21) Appl. No.: 18/645,619

(22) Filed: Apr. 25, 2024

(65) Prior Publication Data

US 2024/0360712 A1 Oct. 31, 2024

(30) Foreign Application Priority Data

Apr. 26, 2023 (EP) .................................... 23169999

(51) Int. Cl.
*E05D 11/10* (2006.01)

(52) U.S. Cl.
CPC ...... *E05D 11/1014* (2013.01); *E05D 11/1007* (2013.01); *E05Y 2900/40* (2013.01); *E05Y 2900/402* (2013.01)

(58) Field of Classification Search
CPC ............. E05D 11/1007; E05D 11/1014; E05D 11/1028; E05D 2011/1035; E05D 11/1078; E05D 11/1085; E05Y 2900/40
USPC .................................... 16/324, 86.1; 49/394
See application file for complete search history.

(56) References Cited

U.S. PATENT DOCUMENTS

| | | | | | |
|---|---|---|---|---|---|
| 76,727 | A * | 4/1868 | Esten | E05D 11/1078 | 16/303 |
| 143,994 | A * | 10/1873 | Nichols | E05D 11/1078 | 16/330 |
| 146,776 | A * | 1/1874 | Nichols | E05D 11/1078 | 16/329 |
| 165,619 | A * | 7/1875 | Sanderson | E05D 11/1014 | 16/318 |
| 294,746 | A * | 3/1884 | Straup et al. | E05D 11/1078 | 16/388 |
| 379,921 | A * | 3/1888 | Wolf | E05D 11/1078 | 16/329 |

(Continued)

FOREIGN PATENT DOCUMENTS

| | | | |
|---|---|---|---|
| DE | 812047 | C | 8/1951 |
| DE | 938535 | C | 2/1956 |

(Continued)

OTHER PUBLICATIONS

Extended European Search Report for EP Application No. 23169999.2 dated Oct. 5, 2025.

(Continued)

*Primary Examiner* — Jeffrey O'Brien
(74) *Attorney, Agent, or Firm* — Foley Hoag LLP; Benjamin A. Vaughan; James S. Ladislaw

(57) ABSTRACT

A hinge locking mechanism is provided for securing a gate, the mechanism comprising a locking component that is connectable to the gate and which is biased against a first plate that is connectable to a post about which the gate pivots, such that the locking component is secured to or within the first plate when the gate is in the closed position (preventing movement of the gate into the open position). Also provided is a gate having said hinge locking mechanism and a method of securing a gate using the mechanism.

9 Claims, 6 Drawing Sheets

(56) References Cited

U.S. PATENT DOCUMENTS

Figure 1:
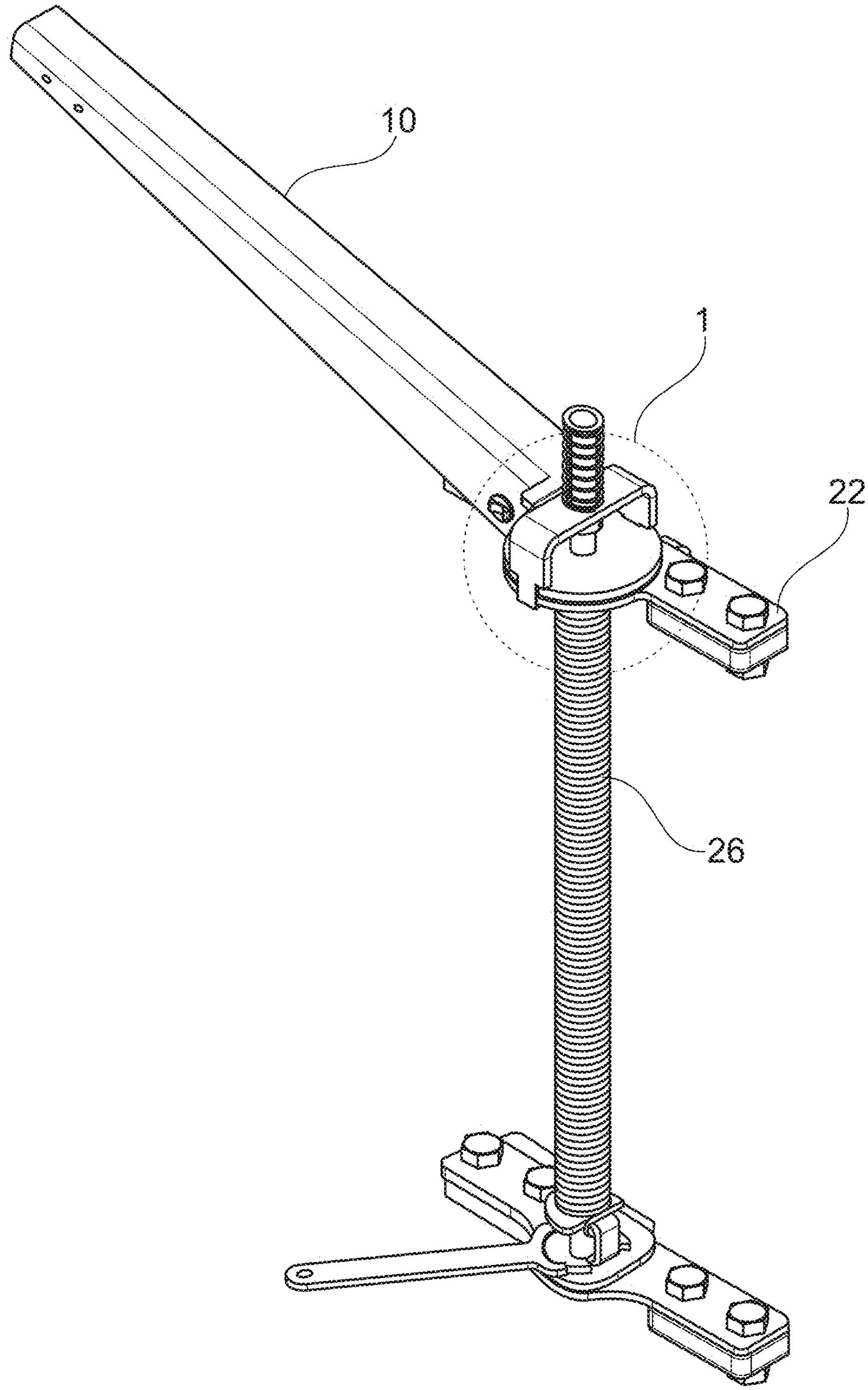

| | | | | | |
|---|---|---|---|---|---|
| 393,200 | A * | 11/1888 | Abbott | E05D 11/1007 | 16/344 |
| 521,429 | A * | 6/1894 | Bessonette | E05D 11/1085 | 16/322 |
| 1,166,702 | A * | 1/1916 | Mardon et al. | E05D 11/1078 | 16/329 |
| 1,294,044 | A * | 2/1919 | Buckwalter et al. | E05D 11/1007 | 16/351 |
| 1,440,713 | A * | 1/1923 | Ausbourne | E05D 5/10 | 16/324 |
| 1,465,912 | A * | 8/1923 | Jensen | E05D 11/1078 | 16/330 |
| 1,612,462 | A * | 12/1926 | Mumford | E05D 11/1078 | 16/351 |
| 1,687,174 | A * | 10/1928 | Mountford | E05D 11/1078 | 16/334 |
| 2,648,092 | A * | 8/1953 | Esslinger | E05D 15/50 | 16/230 |
| 2,966,697 | A * | 1/1961 | Mintz | E05D 11/1078 | 16/332 |
| 3,222,806 | A * | 12/1965 | Martin | E06B 11/04 | 49/237 |
| 3,336,075 | A * | 8/1967 | Wilson | E05D 11/1007 | 16/349 |
| 3,629,900 | A * | 12/1971 | Beerli, Jr. | E05D 11/1007 | 16/349 |
| 3,744,085 | A * | 7/1973 | Griego | E05D 11/1007 | 16/386 |
| 3,955,240 | A * | 5/1976 | Schuh | E05D 11/1007 | 16/326 |
| 4,216,844 | A * | 8/1980 | Klafs | E05D 11/1007 | 16/329 |
| 4,407,045 | A * | 10/1983 | Boothe | E05D 11/1007 | 403/92 |
| 4,566,150 | A * | 1/1986 | Boothe | E06C 1/32 | 16/349 |
| 5,104,161 | A * | 4/1992 | Kautt | E05C 17/00 | 292/157 |
| 6,715,182 | B2 * | 4/2004 | Cheng | E06B 9/04 | 16/280 |
| 7,322,153 | B2 * | 1/2008 | Nitz | E06B 9/04 | 49/394 |
| 7,887,029 | B2 * | 2/2011 | Flannery | E06B 9/06 | 256/65.16 |
| 8,341,806 | B2 * | 1/2013 | Parker | E06C 1/005 | 16/349 |
| 8,707,521 | B1 * | 4/2014 | Mack | E05D 11/1078 | 16/326 |
| 10,697,236 | B2 * | 6/2020 | King | E05D 7/02 | |
| 10,859,079 | B2 | 12/2020 | Zhang et al. | | |
| 12,352,085 | B2 * | 7/2025 | Marsden | E05D 11/1007 | |
| 2014/0019518 | A1 | 1/2014 | Nepper et al. | | |
| 2014/0259532 | A1 * | 9/2014 | Millard | E05D 11/1028 | 16/326 |

FOREIGN PATENT DOCUMENTS

| | | | |
|---|---|---|---|
| DE | 202008016976 | U1 | 3/2009 |
| DE | 202020000327 | U1 | 2/2020 |
| FR | 2519060 | A1 | 7/1983 |

OTHER PUBLICATIONS

Extended European Search Report for EP Application No. 23155274.6 dated Jul. 21, 2023.

* cited by examiner

HINGE LOCKING MECHANISM

CROSS REFERENCE TO RELATED APPLICATIONS

This application claims the benefit of priority to EP Application No. 23169999.2, filed Apr. 26, 2023, the entire contents of which is incorporated herein by reference.

INTRODUCTION

The present invention relates to hinge locking mechanisms, specifically for use with gates, and to gates having such mechanisms fitted.

BACKGROUND TO THE INVENTION

Many types of gate-fastening devices are known. Typically, these share in common the use of a retractable bolt that is protruded from the gate and into a cavity on an adjacent post.

Gate locking mechanisms known in the art are typically not designed with their potential for use in off-shore applications in mind. As such, it is common for the user to require both hands to unlock and open the gate.

In off-shore settings, where ladders up to gates are frequently used and wind speeds can be high, it is very important that a user maintains three points of contact with the ladder at all times. This is problematic when the user reaches the gate and two hands are required for unlocking/opening of the gate.

A hinge locking mechanism is one type of locking mechanism that may be deployed in a setting that does not provide a suitable post (for example) to which the gate can be fastened so as to prevent unintended opening of the gate.

The extreme weather conditions in off-shore settings usually mean traditional hinge locking mechanisms are exposed to strong lateral forces, against which they struggle to withstand. Furthermore, these weather conditions result in frequent and unintended opening and closing of gates fitted with the locking mechanisms.

Types of locking mechanisms known in the art include those described in DE812047C, US393200A, DE202008016976U1 and DE938535C. DE812047C describes a window or door fixed hinge locking mechanism. US393200A describes a locking mechanism for a blind. DE202008016976U1 describes a locking mechanism for windows and door shutters. DE938535C describes a hinge with a locking lever attached to the hinge tab for windows, shutters and doors.

It is clear from the technical field that there exists a need for an alternative and, preferably, improved gate locking mechanism that provides the end user with convenience, safety and security for minimal cost.

An aim of the present invention is therefore to provide a new and improved hinge locking mechanism for a gate.

SUMMARY OF THE INVENTION

The invention provides a hinge locking mechanism for a gate, comprising:

- a locking component that is connectable to the gate and which is biased against a first plate that is connectable to a post about which the gate pivots, such that the locking component is secured to or within the first plate when the gate is in the closed position (this preventing movement of the gate into the open position).

The locking component may elsewhere herein be referred to as a locking pin.

The first plate (and second plate) may elsewhere herein be referred to as a knuckle.

The locking pin and hinge pin are distinct technical features.

Typically, a biasing means, optionally a spring, biases the locking component/locking pin against the first plate. This has the advantage that in the absence of user-initiated actuation to disengage the locking component from the first plate, movement of the gate into the open position is prevented. A user may manipulate/actuate the biasing means to allow for disengagement of the locking component from the first plate, thus permitting the gate to be opened.

In an embodiment, the locking component comprises at least two prongs/arms. The locking component may be substantially U-shaped. Preferably, the U-shaped locking component is inverted and sits above the plate(s)/knuckle(s), such that it is biased down towards them. It should be clear that a U shape can exist in any direction; as such, an inverted U shape is still U-shaped (albeit downward facing).

In an embodiment, the locking component comprises at least one protrusion that is capable of accommodating a recess/cut-out in the first plate when the gate is closed. This protrusion resting in the recess is what prevents rotation of the gate, relative to the gate post. Preferably, the locking component comprises at least two protrusions that each accommodate a separate recess/cut-out in the first plate when the gate is closed. In the case that the locking component is an inverted U-shape, each downward extension (prong/arm) comprises a portion that enters a recess (the protrusion) and a portion that does not (i.e., a portion that abuts the upper surface of the first or second plate, so as to resist the biasing means from pushing the locking component any further). The recesses may be parallel to/sit opposite to the hinge pin. Optionally, the recesses are apertures.

Preferably, the two protrusions on the inverted U-shaped locking pin are located either side of the hinge pin, so as to spread load when the gate is in the closed and locked position but force is being applied try to open the gate. Accordingly, the hinge pin is positioned through the centre of each of the plates. Advantageously, positioning the two protrusions opposite one another provides a highly durable and secure locking mechanism that is resistant to the frequent lateral impacts received by gates, especially in off-shore settings.

Optionally, the locking component is connectable to a lever/handle, such that a user can actuate/manipulate (e.g., by pushing or pulling said lever) the biasing means to disengage the locking component from the first plate, such that the gate can be opened. Preferably, actuation of the lever lifts the protrusion(s) of the inverted U-shaped locking pin out of the recess(es) in the first plate. When the gate is moved, such that the protrusions and recesses no longer are aligned, the lever can be released for the remainder of the gate opening. Optionally, the gate hinge also comprises a (second) spring that biases the gate back into the closed position. In this case, the protrusions will slide along the upper surface of the plate until the recesses are located and aligned; the protrusions will then enter the recesses, resulting in the gate becoming locked in the closed position again. The lever/handle may be elongated for ease of use; this aids in allowing the user to maintain three points of contact (e.g. with a ladder) while operating the gate from either side using one hand. In off-shore settings, this is particularly beneficial to a user advancing up a ladder in extreme weather conditions.

In an embodiment, the locking component is connectable to the gate via a second plate/knuckle that is rotatable relative to the first plate. It is preferred that this second plate is mounted to the gate, with the locking component resting therein, whereas the first plate is mounted to the gate post, such that the two plates are rotatable relative to one another about the axis of the hinge pin. This provides the advantage that rotation of the gate is smooth and controlled, as the two plates complement each other. As such, the plates/knuckles are usually flat (e.g., disc-shaped) and sat one on top of the other.

In an embodiment, the protrusion(s) of the locking component accommodates recesses in the second plate (e.g., when the lever/handle is actuated, the protrusions of the inverted U-shape locking pin are not lifted out of the recesses in the second plate—they are only lifted out of the recesses in the first plate). This provides the additional advantage that the locking component is made more durable through the snug support provided to each of the protrusions.

Accordingly, the invention provides a hinge lock mechanism, comprising:

- first and second knuckles rotatably mounted on a hinge pin;
- wherein the first knuckle comprises a plate extending away from the hinge pin and comprising a first locking recess;
- the second knuckle comprises a plate extending away from the hinge pin and comprising a second locking recess; and
- the mechanism is moveable between (i) a first, locked position in which the first and second recesses are aligned, such that a locking pin can be inserted through the recesses and thus prevent rotation, and (ii) a second, open position in which the locking pin is retracted out of the recesses and the plates can be rotated with respect to each other about the hinge pin.

The invention also provides a gate comprising the hinge locking mechanism described above and below. The gate is frequently metal and suitable for use in offshore settings. The gate is optionally biased into the closed position by a spring located on the hinge. In an embodiment, a double gate is provided with each gate comprising a hinge locking mechanism according to the invention.

Also provided by the invention is a method for securing a gate from opening, wherein a hinge mounted to the gate comprises the locking mechanism described above and below. Upon movement of the gate from the open position to the closed position, a locking component of the hinge may be biased towards and secured to or within a first plate/knuckle, the first plate being mounted to a post about which the gate pivots, such that upon closing of the gate, movement of the gate back into the open position is prevented by the hinge locking mechanism.

EXAMPLES

Figure 2:
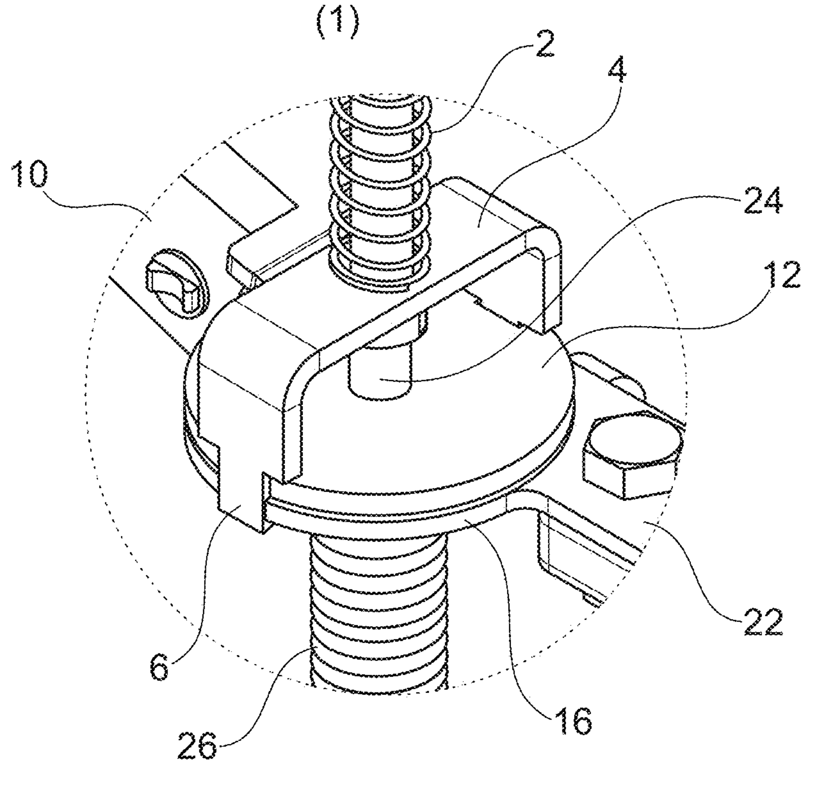
Figure 3:
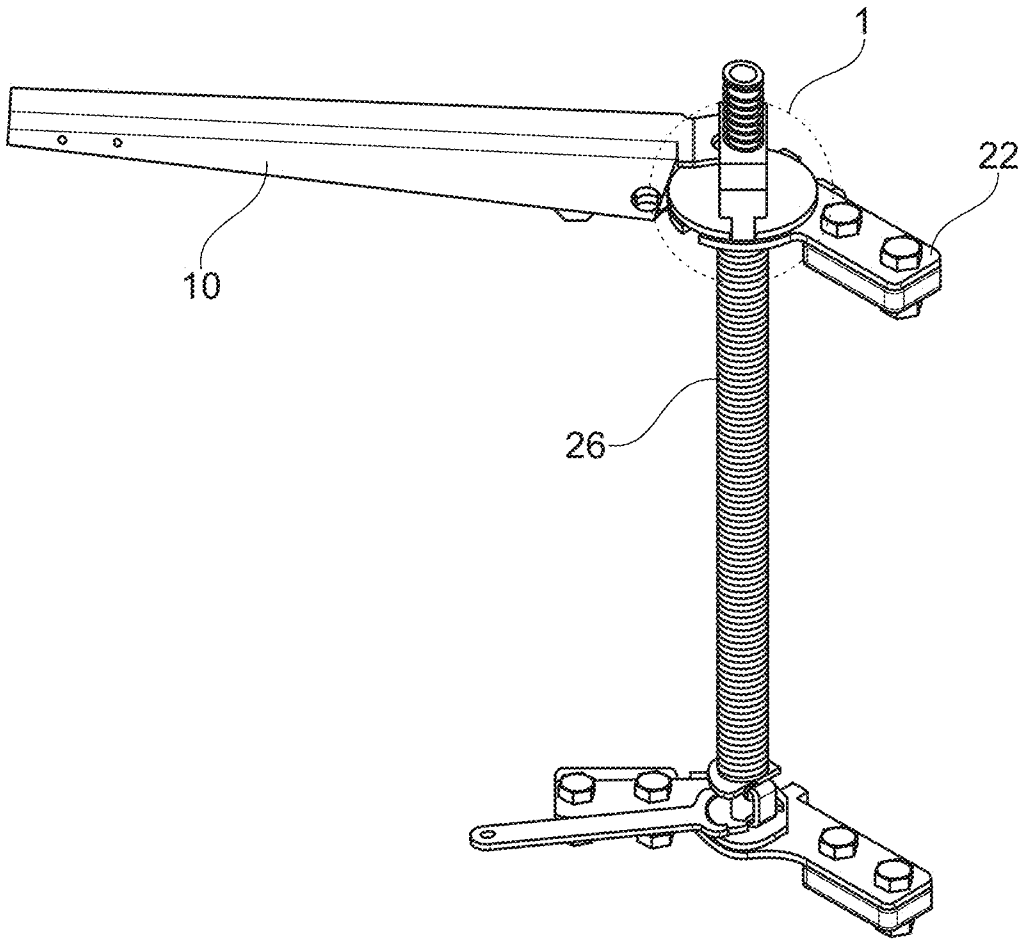
Figure 4:
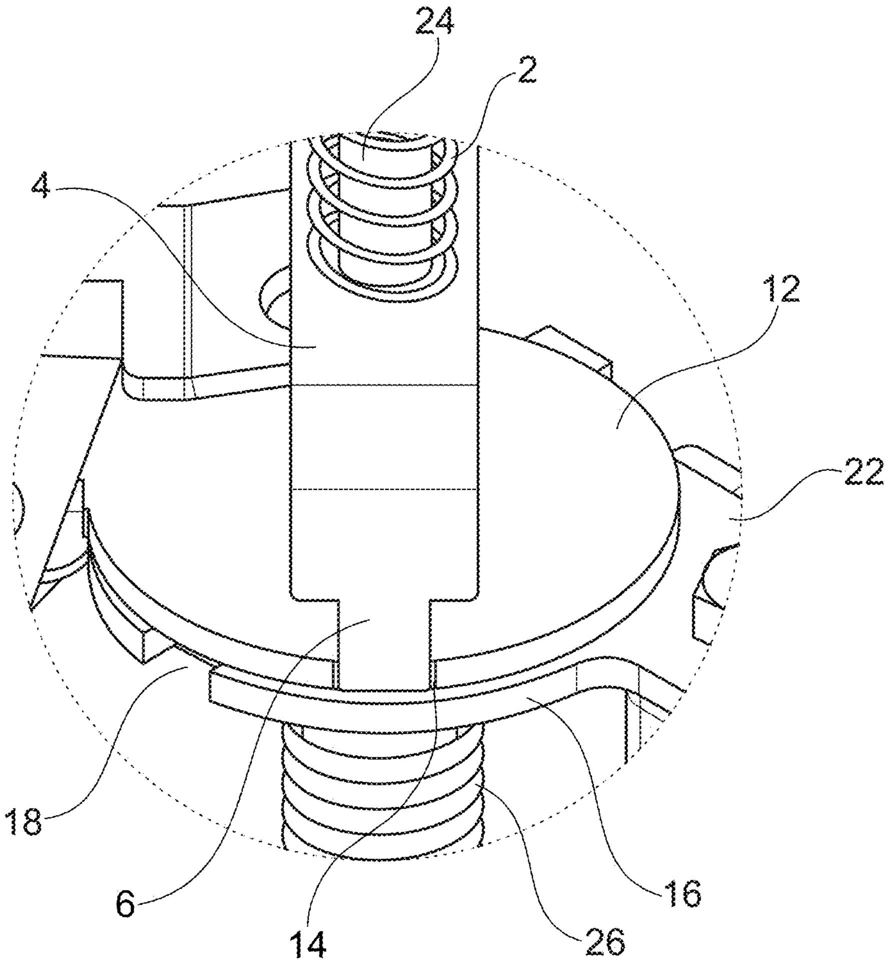
Figure 5:
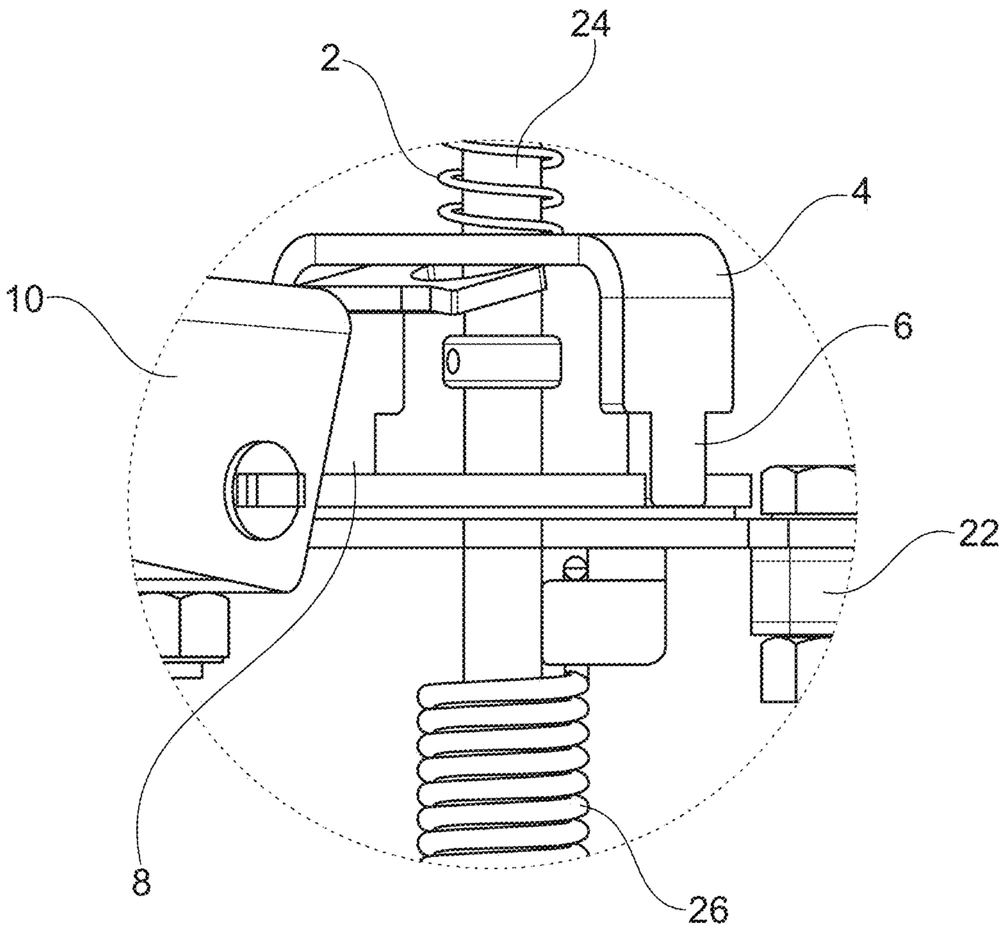
Figure 6:
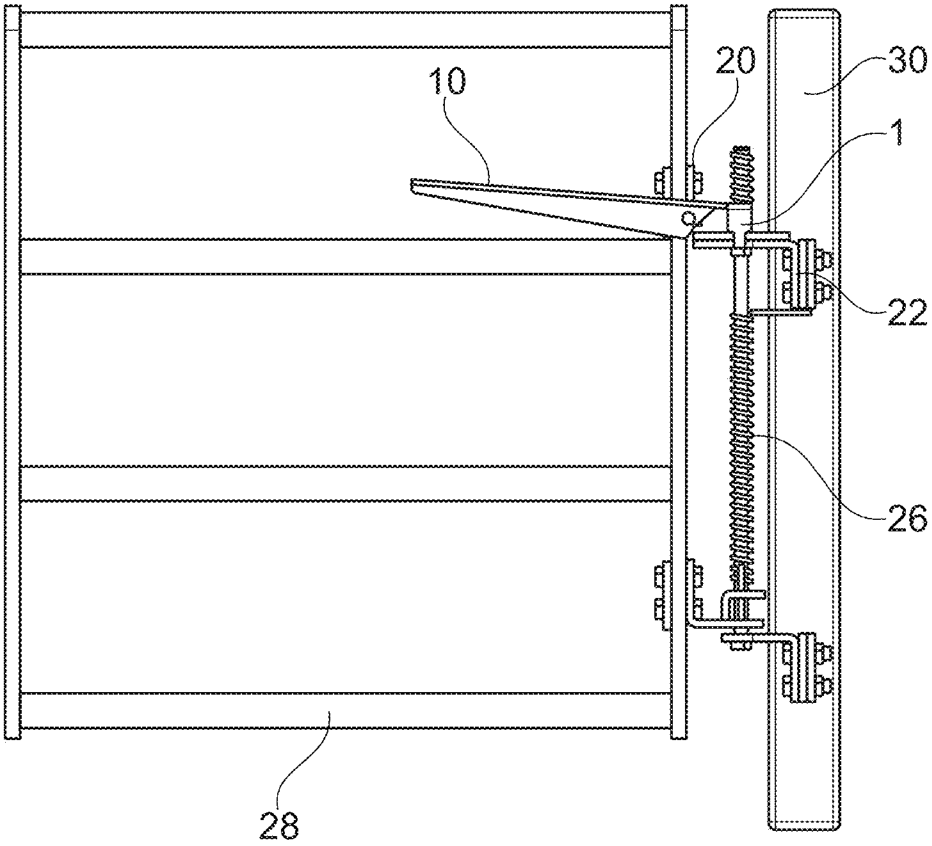

The invention is now illustrated in specific examples, with reference to the accompanying drawings (FIGS. 1-6) which show:

A perspective view of a hinge locking mechanism of the invention in the locked position, in the absence of a gate or gate post (FIG. 1), A zoomed-in view of a hinge locking mechanism of the invention in the locked position (FIG. 2);

A perspective view of a hinge locking mechanism of the invention in the unlocked position, in the absence of a gate or gate post (FIG. 3);

A zoomed-in view of a hinge locking mechanism of the invention in the unlocked position (FIGS. 4 and 5); and A gate and gate post mounted to a hinge comprising a hinge locking mechanism of the invention (FIG. 6).

Example 1—Hinge Locking Mechanism With a Two-Pronged Locking Component

Briefly, as depicted in FIG. 1, there is provided a hinge locking mechanism (1) that is connected to a lever handle (10), capable of actuating the mechanism, and a first hinge leaf (22) for mounting to a gate post (30) (see FIG. 6). The hinge locking mechanism (1) itself is mounted on a hinge pin (24) that passes through its centre via a central aperture in two plates (12, 16) and an inverted U-shaped locking component (4)—these components all being depicted in greater detail in e.g., FIG. 2. The inverted U-shaped locking component (4) is connected at its upper face to a spring (2) which biases the component (4) downwards, such that two protruding arms thereof (6, 8)—otherwise referred to as protrusions—accommodate recesses (14) in the outer-edge of the plate (12) on opposite sides thereof. Actuation of the lever handle (10) forces the inverted U-shaped locking component (4) to move against the bias of the spring (2). While the first plate (16)—otherwise referred to as the first knuckle—is connected to the first hinge leaf (22), the second plate/knuckle (12) is connected to the lever handle (10). The first knuckle (16) sits below the second knuckle (12). A gate (28) is then mounted to a second hinge leaf (20) that is positioned close to the lever handle (10), such that the lever handle (10) is conveniently accessible by a user approaching the gate (28) (see FIG. 6). The gate (28) is also connected to a second spring (26), wrapped around the hinge pin (24), that biases the gate (28) into the closed position when a user releases it.

In greater detail, as can be seen from FIGS. 1, 2 and 6, when the hinge locking mechanism (1) is in the locked position and the gate (28) is closed, opening of the gate (28) is prevented by the inverted U-shaped locking component (4). The locking component (4) is biased downwards by spring (2), such that its protrusions (6, 8) rest in recesses (14, 18) in the two plates (12, 16). It is the first plate (16) that resists movement/opening of the gate (28), since it is fixed to the gate post (30); this is possible because the protrusions (6, 8) of the locking component (4) abut the edges of the recesses (18), preventing rotation of the second plate (12) and locking component (4) relative to the first plate (16).

If a user wishes to open the gate (28), this can be achieved through actuation of the hinge locking mechanism (1) via the lever handle (10). As can be seen from FIGS. 3, 4 and 6, pushing down on the lever handle (10) forces the inverted U-shaped locking component (4) upwards to compress the spring (2) and lift the protrusions (6, 8) out of the recesses (18) in the first plate (16).

With the protrusions (6, 8) of the inverted U-shaped locking component (4) out of the first plate recesses (18), the second plate (12) is free to rotate, relative to the first plate (16). Since it is the second plate (12) that is connected to the gate (28)/lever arm (10), the protrusions (6, 8) can rest in the second plate recesses (14) without preventing movement/opening of the gate (28). The user is thus able to open the gate and pass through it.

Once a user has opened the gate (28) and passed through it, there is no need for the user to manually close the gate (28). Upon releasing the lever handle (10) while the gate (28) is in the open position, the spring (2) exerts its bias against the inverted U-shaped locking component (4), pushing it downwards towards the first plate (16). However, with the protrusions (6, 8) out of alignment with the first plate recesses (18), the locking mechanism (1) cannot enter the locked position. Instead, the protrusions (6, 8) merely abut the top surface of the first plate (16). The gate (28) is, nevertheless, connected to a closing spring (26), which biases the gate (28) back into the closed position, in which the protrusions (6, 8) align with the first plate recesses (18). Upon alignment, the spring (2) pushes the locking component (4) downwards into the first plate recesses (18) and locks the gate (28) in the closed position.

Example 2—Hinge Locking Mechanism With a Three-Pronged Locking Component

In another example, there is provided a hinge locking mechanism (1) that is connected to a lever handle (10), capable of actuating the mechanism, and a first hinge leaf (22) for mounting to a gate post (30). The hinge locking mechanism (1) itself is mounted on a hinge pin (24) that passes through its centre via a central aperture in two plates (12, 16) and a locking component (not shown) with 3 prongs, the prongs being spaced equally apart. The locking component is connected at its upper face to a spring (2) which biases the component downwards, such that the tips of three protruding prongs/arms thereof—otherwise referred to as protrusions—accommodate recesses (14) in the outer-edge of the plate (12). Actuation of the lever handle (10) forces the locking component to move against the bias of the spring (2). While the first plate (16)—otherwise referred to as the first knuckle—is connected to the first hinge leaf (22), the second plate/knuckle (12) is connected to the lever handle (10). The first knuckle (16) sits below the second knuckle (12). A gate (28) is then mounted to a second hinge leaf (20) that is positioned close to the lever handle (10), such that the lever handle (10) is conveniently accessible by a user approaching the gate (28). The gate (28) is also connected to a second spring (26), wrapped around the hinge pin (24), that biases the gate (28) into the closed position when a user releases it.

When the hinge locking mechanism (1) is in the locked position and the gate (28) is closed, opening of the gate (28) is prevented by the locking component (not shown). The locking component is biased downwards by a spring (2), such that its protrusions rest in recesses in the two plates (12, 16). It is the first plate (16) that resists movement/opening of the gate (28), since it is fixed to the gate post (30); this is possible because the protrusions of the locking component abut the edges of the recesses, preventing rotation of the second plate (12) and locking component relative to the first plate (16).

If a user wishes to open the gate (28), this can be achieved through actuation of the hinge locking mechanism (1) via the lever handle (10). Pushing down on the lever handle (10) forces the locking component (not shown) upwards to compress the spring (2) and lift the protrusions out of the recesses in the first plate (16).

With the protrusions of the locking component (not shown) out of the first plate recesses, the second plate (12) is free to rotate, relative to the first plate (16). Since it is the second plate (12) that is connected to the gate (28)/lever arm (10), the protrusions can rest in the second plate recesses without preventing movement/opening of the gate (28). The user is thus able to open the gate and pass through it.

Once a user has opened the gate (28) and passed through it, there is no need for the user to manually close the gate (28). Upon releasing the lever handle (10) while the gate (28) is in the open position, the spring (2) exerts its bias against the locking component (not shown), pushing it downwards towards the first plate (16). However, with the protrusions out of alignment with the first plate recesses, the locking mechanism (1) cannot enter the locked position. Instead, the protrusions merely abut the top surface of the first plate (16). The gate (28) is, nevertheless, connected to a closing spring (26), which biases the gate (28) back into the closed position, in which the protrusions align with the first plate recesses. Upon alignment, the spring (2) pushes the locking component downwards into the first plate recesses and locks the gate (28) in the closed position.

REFERENCE LIST

Hinge Locking Mechanism (1)
Spring biasing means (2)
U-shaped locking component/locking pin (4)
First locking pin/protrusion (6)
Second locking pin/protrusion (8)
Lever/handle (10)
Second plate/knuckle (12)
Second recess (14)
First plate/knuckle (16)
First recess (18)
Second hinge leaf (20)
First hinge leaf (22)
Hinge pin (24)
Gate closing spring (26)
Gate (28)
Gate Post (30)

The invention hence provides a hinge locking mechanism and a gate assembly comprising said mechanism.

The invention claimed is:

1. A gate comprising:

a hinge locking mechanism (1) for the gate (28), the hinge locking mechanism (1) comprising:

a locking component (4) that is connectable to the gate and which is biased against a first plate (16) that is connectable to a post (30) about which the gate pivots, such that the locking component is secured to or within the first plate when the gate is in the closed position, thereby preventing movement of the gate into the open position, wherein a biasing means (2) biases the locking component against the first plate, and wherein the locking component comprises at least two protrusions (6, 8) disposed on L-shaped arms that each extend radially from a rotational axis of a hinge pin, then each extend downwardly and parallel to the rotational axis to spread load when force is applied to open the gate that accommodate separate recesses or cut-outs (14, 18) in the first plate when the gate is closed, and wherein the hinge locking mechanism (1) is configured for a user to operate the gate with one hand while maintaining three points of contact with a ladder.

2. The gate according to claim 1, wherein a first spring (2) acts as the biasing means.

3. The gate according to claim 1, wherein the biasing means is manipulable to disengage the locking component from the first plate, such that the gate is configured to be opened.

4. The gate according to claim 1, wherein the locking component comprises three protrusions.

5. The gate according to claim 1, wherein the locking component is in an inverted U-shaped configuration.

6. The gate according to claim 1, wherein the locking component is connectable to a lever or handle (10) manipulable by the user, said lever or handle (10) configured to manipulate the biasing means to disengage the locking component from the first plate, such that the gate is configured to be opened.

7. The gate according to claim 1, wherein the locking component is connectable to the gate via a second plate (12), to or within which it is secured, the second plate being mountable to the gate and rotatable relative to the first plate.

8. The gate according to claim 7, wherein the locking component sits above and rests within the second plate which, in turn, sits above the first plate.

9. The gate according to claim 1, wherein the recesses or cut-outs are positioned parallel to and on opposite sides of the hinge pin and in an outer edge of the first plate, and where the first plate comprises a disc shape.

* * * * *